(12) United States Patent
Lee et al.

(10) Patent No.: US 10,740,865 B2
(45) Date of Patent: Aug. 11, 2020

(54) IMAGE PROCESSING APPARATUS AND METHOD USING MULTI-CHANNEL FEATURE MAP

(71) Applicant: SAMSUNG ELECTRONICS CO., LTD., Suwon-si, Gyeonggi-do (KR)

(72) Inventors: Won-jae Lee, Hwaseong-si (KR); Yong-seok Choi, Seoul (KR); Min-soo Kim, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 241 days.

(21) Appl. No.: 15/957,135

(22) Filed: Apr. 19, 2018

(65) Prior Publication Data

US 2018/0365794 A1    Dec. 20, 2018

(30) Foreign Application Priority Data

Jun. 15, 2017    (KR) ........................ 10-2017-0075818

(51) Int. Cl.
*G06K 9/62*        (2006.01)
*G06T 1/20*        (2006.01)
(Continued)

(52) U.S. Cl.
CPC ............. *G06T 1/20* (2013.01); *G06N 3/0454* (2013.01); *G06N 3/0481* (2013.01); *G06N 3/063* (2013.01); *G06N 3/0445* (2013.01); *G06N 3/0472* (2013.01)

(58) Field of Classification Search
CPC .. G06K 9/4628; G06K 9/6268; G06K 9/6271; G06N 20/00; G06N 3/0454
(Continued)

(56) References Cited

U.S. PATENT DOCUMENTS 9,223,511 B2    12/2015   Rudelic
9,524,450 B2    12/2016   Ravindran et al.
(Continued)

FOREIGN PATENT DOCUMENTS

EP    3 104 309    12/2016
JP    7-69894      7/1995
(Continued)

OTHER PUBLICATIONS

S. Han et al., "EIE: Efficient Inference Engine on Compressed Deep Neural Network", Stanford University—ISCA2016, Jun. 20, 2016, 30 pages.
(Continued)

*Primary Examiner* — Charlotte M Baker
(74) *Attorney, Agent, or Firm* — Nixon & Vanderhye, P.C.

(57) ABSTRACT

A convolution neural network (CNN)-based image processing method and apparatus are provided. The CNN-based image processing method includes identifying whether values of pixels of each of feature maps having a plurality of channels at a first layer are zero, and storing information regarding a result of identifying whether the values of the pixels are zero; writing image feature information of the feature maps at the first layer to an external memory; reading information regarding pixels having values which are not zero among the written image feature information from the external memory based on the information regarding the result of identifying whether the values of the pixels are zero; and performing a feature map operation at a second layer using the read image feature information of the feature maps.

20 Claims, 11 Drawing Sheets

(51) Int. Cl.
*G06N 3/04* (2006.01)
*G06N 3/063* (2006.01)

(58) Field of Classification Search
USPC ........................................................ 382/156
See application file for complete search history.

(56) References Cited

U.S. PATENT DOCUMENTS

| | | | |
|---|---|---|---|
| 2016/0322042 | A1 | 11/2016 | Vlietinck et al. |
| 2016/0350645 | A1 | 12/2016 | Brothers et al. |
| 2016/0358069 | A1 | 12/2016 | Brothers et al. |
| 2016/0358070 | A1* | 12/2016 | Brothers .............. G06N 3/0454 |
| 2016/0378465 | A1 | 12/2016 | Venkatesh et al. |
| 2017/0064584 | A1 | 3/2017 | Shan et al. |
| 2017/0124432 | A1 | 5/2017 | Chen et al. |

FOREIGN PATENT DOCUMENTS

| | | |
|---|---|---|
| KR | 10-2016-0127792 | 11/2016 |
| KR | 10-2016-0140394 | 12/2016 |
| KR | 10-2016-0142791 | 12/2016 |
| WO | 2016/141282 | 9/2016 |

OTHER PUBLICATIONS

J. Kim et al., "Accurate Image Super-Resolution Using Very Deep Convolutional Networks", Proc. of IEEE Conference on Computer Vision and Pattern Recognition (CVPR), Nov. 11, 2016, 9 pages.
Search Report dated Jul. 27, 2018 in counterpart International Patent Application No. PCT/KR2018/004610.
Written Opinion dated Jul. 27, 2018 in counterpart International Patent Application No. PCT/KR2018/004610.
Extended Search Report dated Jan. 3, 2020 in counterpart European Patent Application No. 18818948.4.
Chen, Yu-Hsin et al., "Eyeriss: An Energy-Efficient Reconfigurable Accelerator for Deep Convolutional Neural Networks," IEEE Journal of Solid-State Circuits, IEEE Service Center, Piscataway, NJ, USA, vol. 52, No. 1, Jan. 1, 2017, pp. 127-138.

* cited by examiner

IMAGE PROCESSING APPARATUS AND METHOD USING MULTI-CHANNEL FEATURE MAP

CROSS-REFERENCE TO RELATED APPLICATION

This application is based on and claims priority under 35 U.S.C. § 119 to Korean Patent Application No. 10-2017-0075818, filed on Jun. 15, 2017, in the Korean Intellectual Property Office, the disclosure of which is incorporated by reference herein in its entirety.

BACKGROUND

1. Field

The disclosure relates to an artificial intelligence (AI) system using a machine learning algorithm and applications thereof, and for example, to an image processing apparatus and method for decreasing the amount of calculation and memory bandwidth during a convolutional neural network (CNN)-based image processing process using a multi-channel feature map.

2. Description of Related Art

Artificial intelligence (AI) systems are computer systems capable of achieving a level of human intelligence and are self-learning and self-determining machines. As use of such AI systems increases, a recognition rate thereof is increasingly improved.

AI technology includes a machine learning (deep learning) technique using an algorithm for self-sorting/learning features of input data, and element techniques using a machine learning algorithm to imitate the human brain's cognitive function, determination function, etc.

The element techniques include, for example, at least one among a linguistic comprehension technique for identifying human language/characters, a visual comprehension technique for identifying things in terms of human perspective, an inference/prediction technique for identifying and logically reasoning information and making predictions, a knowledge representation technique for processing human experience information based on knowledge data, an operation control technique for controlling self-driving of a vehicle and a robot's movement, etc.

In particular, the visual comprehension technique which identifies and processes things in terms of human perspective includes object recognition, object tracing, video searching, recognition of human beings, scene comprehension, understanding of a space, video enhancement, etc.

SUMMARY

Various embodiments of the present disclosure provide image processing apparatuses and methods for analyzing each of feature maps at a first layer and determining feature maps for performing a multi-channel feature map operation at a second layer using a result of analyzing each of the feature maps at the first layer during a convolution neural network (CNN)-based image processing process using a multi-channel feature map, thereby decreasing the amount of calculation and memory bandwidth.

Additional aspects will be set forth in part in the description which follows and, in part, will be apparent from the description.

In accordance with an aspect of the disclosure, a CNN-based image processing apparatus includes a storage unit comprising a memory; and a controller configured to identify whether values of pixels of each of feature maps having a plurality of channels at a first layer are zero, to control information regarding a result of identifying whether the values of the pixels are zero to be stored in the storage unit, to write image feature information of the feature maps at the first layer to an external memory, to read information regarding pixels having values that are not zero among the written image feature information from the external memory based on the information regarding the result of identifying whether the values of the pixels are zero, and to perform a feature map operation at a second layer using the read information.

In accordance with another aspect of the disclosure, an image processing method performed by a processor which is based on a CNN includes identifying whether values of pixels of each of feature maps having a plurality of channels at a first layer are zero, and storing information regarding a result of identifying whether the values of the pixels are zero; writing image feature information of the feature maps at the first layer to an external memory; reading information regarding pixels having values which are not zero among the written image feature information from the external memory, based on the information regarding the result of identifying whether the values of the pixels are zero; and performing a feature map operation at a second layer using the read information.

In accordance with another aspect of the disclosure, an image processing apparatus based on a CNN includes a storage unit comprising a memory; and a controller configured to identify whether values of pixels of each of feature maps having a plurality of channels at a first layer are zero, to control information regarding a result of identifying whether the values of the pixels are zero to be stored in the storage unit, to write image feature information of feature maps among the written image feature information, excluding a feature map of which values of pixels are all zero, to an external memory based on the information regarding the result of identifying whether the values of the pixels are zero, to read the written image feature information of the feature maps from the external memory, and perform a feature map operation at a second layer using the read image feature information of the feature maps.

In accordance with another aspect of the disclosure, a non-transitory computer-readable recording medium having recorded thereon a program for performing a method according to an embodiment of the disclosure in a computer is provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
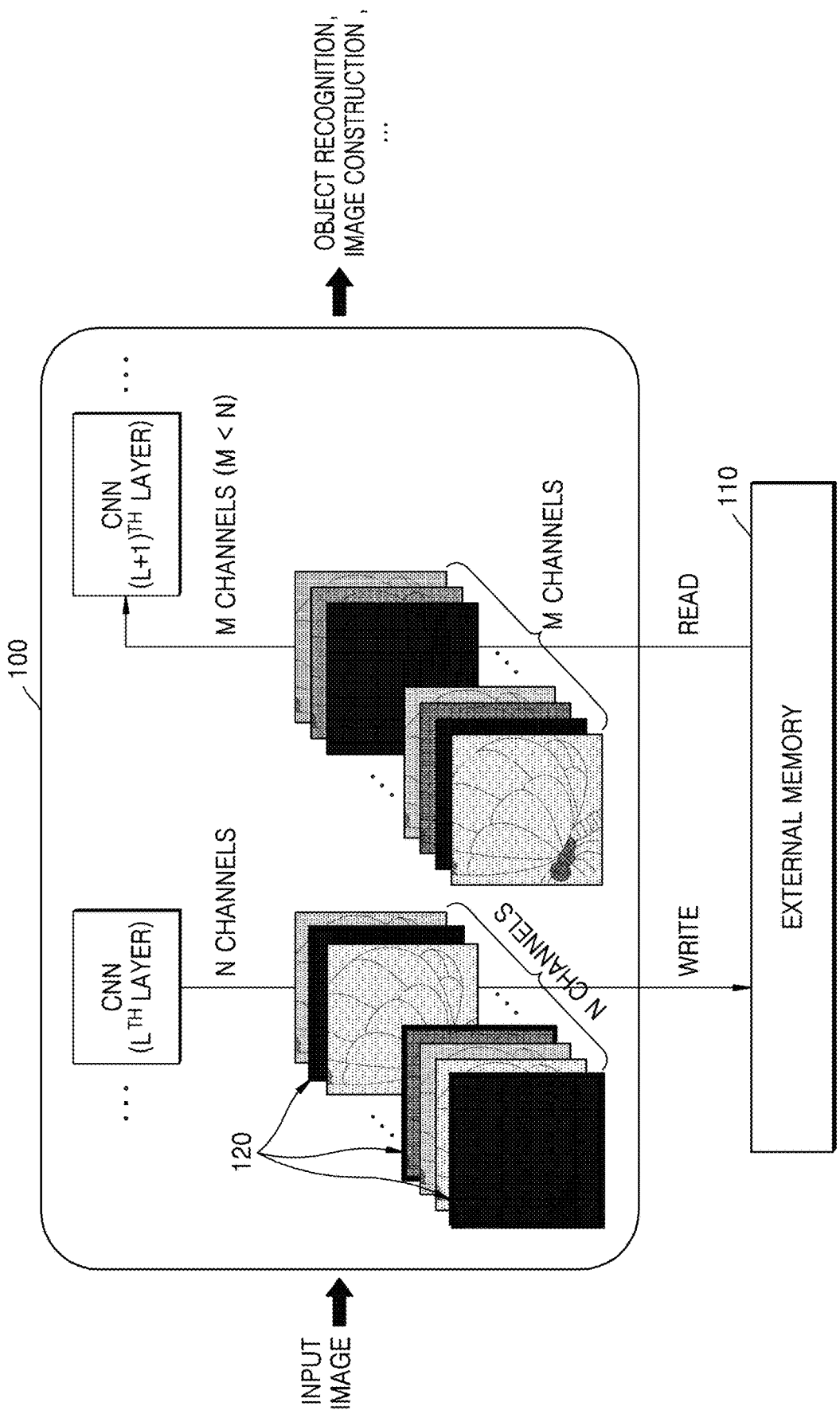
FIG. 1 is a diagram illustrating an image processing apparatus for analyzing each of feature maps at a first layer and determining feature maps for performing a multi-channel feature map operation at a second layer using a result of analyzing each of the feature maps during a convolutional neural network (CNN)-based image processing process using a multi-channel feature map, according to an embodiment.

As used herein, general terms that have been widely used are selected, if possible, in consideration of functions of the disclosure, but arbitrary terms may be selected according to the intentions of technicians in the this art, precedents, or new technologies, etc. Thus, the terms used herein should be defined not based on the names thereof but based on the meanings thereof and the whole context of the disclosure.

It will be understood that, although the terms "first", "second", etc. may be used herein to describe various elements, these elements should not be limited by these terms. These terms are only used to distinguish one element from another element.

The terminology used herein is for the purpose of describing particular embodiments only and is not intended to be limiting of the scope of the disclosure. As used herein, the singular forms "a", "an" and "the" are intended to include the plural forms as well, unless the context clearly indicates otherwise. It will be understood that when an element or layer is referred to as being "connected to" another element or layer, the element or layer can be directly connected to another element or layer or can be electrically connected to another element or layer having intervening elements or layers therebetween. It will be further understood that the terms "comprise" and/or "comprising," when used in this disclosure, specify the presence of stated features, integers, steps, operations, elements, and/or components, but do not preclude the presence or addition of one or more other features, integers, steps, operations, elements, components, and/or groups thereof.

The use of the term "the" and similar referents in the context of describing the disclosure (especially in the context of the following claims) are to be understood to cover both the singular and the plural. The operations of all methods described herein can be performed in any appropriate order unless otherwise indicated herein. The disclosure should not be understood as being limited by the order in which the operations are described.

As used herein, the expressions "in some embodiments" or "in an example embodiment" should not be understood to indicate the same embodiments.

Some embodiments of the disclosure may be represented using functional block components and various operations. Some or all of such functional blocks may be realized by any number of hardware and/or software components configured to perform specified functions. For example, functional blocks of the disclosure may be realized by one or more microprocessors or circuit structures for certain functions. For example, the functional blocks of the disclosure may be implemented with any programming or scripting language. The functional blocks may be realized by an algorithm executed by one or more processors. Furthermore, the disclosure may employ conventional techniques for electronics configuration, signal processing and/or data processing.

The lines or connecting elements illustrated in the appended drawings are intended to represent example functional relationships and/or physical or logical couplings between various elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list.

Hereinafter, the disclosure will be described in greater detail with reference to the accompanying drawings.

FIG. 1 is a diagram illustrating an image processing apparatus for analyzing each of feature maps at a first layer and determining feature maps for performing a multi-channel feature map operation at a second layer using a result of analyzing each of the feature maps at the first layer during a convolutional neural network (CNN)-based image processing process using a multi-channel feature map, according to an embodiment.

A neural network may refer, for example, to a computational architecture obtained by modeling, for example, a biological brain. In the neural network, nodes corresponding to neurons of the brain are connected to each other and are collectively operated to process input data. There are various types of neural networks, such as, for example, and without limitation, a CNN, a recurrent neural network (RNN), a deep belief network (DBN), a restricted Boltzman machine (RBM) method, or the like, but embodiments are not limited thereto. In a feed-forward neural network, there are links between neurons of the neural network and other neurons. The links may be expanded in only one direction, e.g., a forward direction, through the neural network.

The CNN may be used to extract "features" such as edges, lines, or colors from complicated input data. The CNN may include a plurality of layers. Each of the plurality of layers may be configured to receive input data and produce output data by processing the received input data. The output data may be a feature map obtained by applying a convolution operation to an input image or an input feature map with filter kernels. Initial layers of the CNN may be operated to extract low-level features such as edges or gradients from an input. Subsequent layers of the CNN may be configured to extract more complicated features such as eyes, a nose, etc.

Referring to FIG. 1, an image processing apparatus 100 according to an embodiment may perform object recognition, image reconstruction, semantic segmentation, scene recognition, or the like, on an image through a CNN-based image processing process. Referring to FIG. 1, the image processing apparatus 100 is illustrated as having feature maps having N channels at an $L^{th}$ layer and feature maps having M channels at an $(L+1)^{th}$ layer (here, M<N, M and N each represents an integer) but is not limited thereto, and may include a CNN having a plurality of layers needed to perform desired image processing. The CNN-based image processing will be described in detail with reference to FIGS. 2 and 3 below.

In an example embodiment, an external memory 110 may be a hardware device configured to write and read a program. Referring to FIG. 1, the external memory 110 is illustrated as an element separated from the image processing apparatus 100 but is not limited thereto, and may be included in the image processing apparatus 100 and perform a function thereof in the image processing apparatus 100.

In an example embodiment, the image processing apparatus 100 may identify whether values of pixels of each of features maps having a plurality of channels at the first layer are zero, store information regarding a result of identifying whether the values of the pixels are zero, write image feature information of the feature maps at the first layer to the external memory 110, read information regarding pixels having values which are not zero from among the image feature information written to the external memory 110 from the external memory 110 based on information regarding the result of identifying whether the values of the pixels are zero, and perform a feature map operation at the second layer using the read information.

Referring to FIG. 1, the external memory 110 may be used to store a large amount of intermediate data produced while the CNN is run. The external memory 110 may be also used to store a large number of filter kernels used at the plurality of layers including the $L^{th}$ layer and the $(L+1)^{th}$ layer. The intermediate data may represent data of multi-channel feature maps produced at hidden convolution layers of the CNN, e.g., a plurality of layers.

The multi-channel feature maps may include several tens of or several hundreds of feature map images. For example, each of these feature maps may be a two-dimensional (2D) image of 16 bits representing levels of features learned at all x and y locations. In an example embodiment, in order to produce feature maps at the $(L+1)^{th}$ layer of the CNN, feature maps output from the $L^{th}$ layer may be written to the external memory 110 and read from the external memory 110. Referring to FIG. 1, when N feature maps (i.e., feature maps having N channels) are produced at the $L^{th}$ layer to be inputs of $(L+1)^{th}$ layer and N feature maps are output from the $(L+1)^{th}$ layer, each of the feature maps at the $L^{th}$ layer may be read N times from the external memory 110 for execution of the $(L+1)^{th}$ layer. Accordingly, reading of a total of N feature maps from the $L^{th}$ layer should be performed among operations of the CNN.

As described above, each of the layers of the CNN may continuously and repeatedly perform a read operation and a write operation with respect to the external memory 110 to produce the intermediate data. As the number of multi-channel feature maps produced as the intermediate data increases, a frequency of access of the external memory 110 increases, and thus, the amount of an image to be transmitted may be excessive. Accordingly, there is a need for a method of decreasing the amount of an image to be transmitted at each of the layers of the CNN to access the external memory 110.

Thus, referring to FIG. 1, if each of the feature maps having the N channels at the $L^{th}$ layer may be analyzed and the number of feature maps for performing a feature map operation at the $(L+1)^{th}$ layer may be decreased, for example, to M channels (here, M<N), using a result of analyzing each of the feature maps, the amount of calculation and a necessary memory bandwidth may be decreased by reading, from the external memory 110, only feature maps among the feature maps at the $L^{th}$ layer excluding feature maps 120 of which values of pixels are all zero. In an example embodiment, the feature map operation performed at the $(L+1)^{th}$ layer may include a convolution operation, an activation function operation, a pooling operation, or a resampling operation but is not limited thereto.

Figure 2:
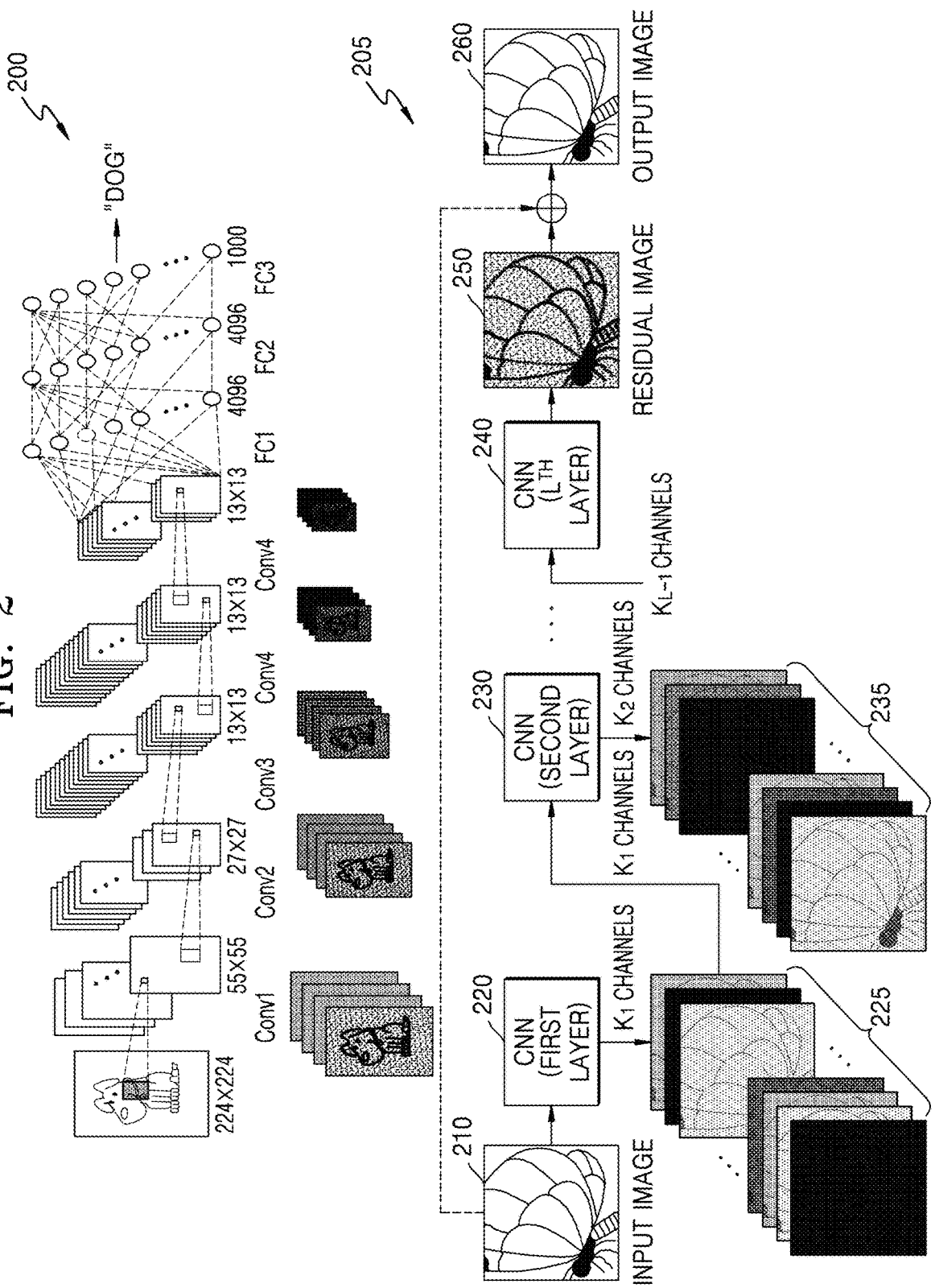
FIG. 2 is a diagram illustrating an example of a CNN-based image processing process using a multi-channel feature map, according to an embodiment.

FIG. 2 is a diagram illustrating an example of a CNN-based image processing process using a multi-channel feature map, according to an example embodiment.

Referring to FIG. 2, CNN-based image processing is applicable in various fields. The CNN-based image processing may be employed by an image processing apparatus for, for example, and without limitation, object recognition of an image, an image processing apparatus for image reconstruction, an image processing apparatus (not shown) for semantic segmentation, an image processing apparatus (not shown) for scene recognition, or the like.

Object recognition may be understood as, for example, and without limitation, processing 200 performed to recognize a region of an image, which is identified as an object, as one of a plurality of predetermined classes. The object may be understood as a specific object included in the image. For example, referring to FIG. 2, a dog included in an input image may be recognized as an object. Image reconstruction may be understood as processing 205 performed to correct images. For example, referring to FIG. 2, image reconstruction may be understood as super-resolution reconstruction, e.g., sharpening of a blurred image. Semantic segmentation may be understood as labeling some parts of an image. Scene recognition may be understood as processing performed to identify a specific scene, e.g., an office, a bedroom, a playground, or the like, represented in an image. In addition to such visual examples, there may be many other application domains to which similar CNNs are efficiently applicable.

The CNN may be compute-intensive. For example, the CNN may perform many operations on each image, require many weights, and produce a large amount of intermediate result traffic. Furthermore, the CNN may perform giga operations per second (GOPS) on each image, use hundreds of millions of weights to hundreds of billions of weights, and produce intermediate data of hundreds of gigabytes. In implementation of many operations, weights and intermediate data traffic may incur high costs in terms of power efficiency. When the efficiency of calculation of the CNN increases, such traffic occupies a higher percentage of the amount of power consumed to execute the CNN. Thus, use of a neural network in a mobile device, an application or a computing environment limited in terms of power is restricted. In an embodiment set forth herein, a method of efficiently writing multi-channel feature map images produced during a CNN-based image processing process to an external memory and reading the multi-channel feature map images from the external memory is suggested to minimize and/or reduce delay in a read/write operation performed on an internal or external memory.

The CNN-based image processing process will be described with respect to a super-resolution reconstruction processing process 205 among image processing methods illustrated in FIG. 2 below.

FIG. 2 illustrates an input image 210, a plurality of layers 220, 230, and 240, multi-channel feature map images 225 and 235, a residual image 250 and an output image 260 processed through the plurality of layers 220, 230, and 240. For example, the input image 210 may be an image to be processed through the CNN.

In an example embodiment, the plurality of layers 220, 230, and 240 identify features of an input image by applying a filter having a certain size from an upper left side of input data to a lower right side of the input data.

For example, the plurality of layers 220, 230, and 240 may multiply a left upper 3×3 pixels of the input data by a weight, and map it to a neuron at an upper left side of a feature map. In this case, the multiplied weight may be 3×3. Similarly, the plurality of layers 220, 230, and 240 scan the input data from left to right and from top to bottom one by one, and multiply the weight to map a neuron of the feature map. In this case, the 3×3 weight is referred to as a filter or a filter kernel.

That is, a process of applying the filter at the plurality of layers 220, 230, and 240 may be a process of performing the convolution operation using the filter kernel, and an output extracted as a result of performing the convolution operation is referred to as a "feature map" or a "feature map image".

The term "multi-channel feature map" may be understood as a set of feature maps corresponding to a plurality of channels, for example, a plurality of pieces of image data. The multi-channel feature maps may be an input of a certain layer of the CNN and an output obtained as a result of performing a feature map operation such as the convolution operation. In an example embodiment, the multi-channel feature maps 225 and 235 are produced through the plurality of layers 220, 230, and 240 which are also referred to, for example, and without limitation, as "feature extraction layers" or "convolution layers" of the CNN. The plurality of layers 220, 230, and 240 may sequentially receive multi-channel feature maps produced by preceding layers and produce subsequent multi-channel feature maps as outputs. Finally, the $L^{th}$ layer 240 (here, L represents an integer) receives multi-channel feature maps produced by the $(L-1)^{th}$ layer (not shown) and produces a residual image 250. In an example embodiment, when the residual image 250 is produced, an output image 260 may be produced from the sum of the residual image 250 and the input image 210. In an example embodiment, the input image 210 may be a low-resolution image and the output image 260 may be a high-resolution image. That is, the image processing process illustrated in FIG. 2 may be understood as a process of reconstructing the low-resolution image to the high-resolution image.

Referring to FIG. 2, the feature maps 225 having K1 channels are outputs of the first layer 220 performing a feature map operation on the input image 210 and are inputs of the second layer 230 to be used to perform a feature map operation. Similarly, the feature maps 235 having K2 channels are outputs of the second layer 230 performing a feature map operation on the input feature maps 225 and are inputs of a third layer (not shown) to be used to perform a feature map operation.

In an example embodiment, a flow of data during the CNN-based image processing process shows that the multi-channel feature maps 225 and 235 and the residual image 250 are sequentially obtained, and finally, the output image 260 is obtained from the input image 210. At least one layer or all layers receiving and producing the multi-channel feature maps 225 and 235 may be hidden layers (e.g., hidden convolution layers). Other processing operations may be performed, as well as the operation applying convolution kernels for mapping input feature maps to output feature maps. Examples of the other processing operations may include application of the activation function operation, the pooling operation, resampling, etc. but are not limited thereto.

Referring to FIG. 2, the multi-channel feature maps 225 produced by the first layer 220 include feature maps corresponding to the K1 channels (here, K1 represents an integer). The multi-channel feature maps 235 produced by the second layer 230 220 include feature maps corresponding to the K2 channels (here, K2 represents an integer). Here, K1 and K2 each representing the number of channels respectively correspond to the number of filter kernels used by the first layer 220 and the number of filter kernels used by the second layer 230. That is, the number of multi-channel feature maps produced by an $M^{th}$ layer (here, M is an integer greater than or equal to 1 and equal or less than L-1) is equal to the number of filter kernels used by the $M^{th}$ layer.

Figure 3:
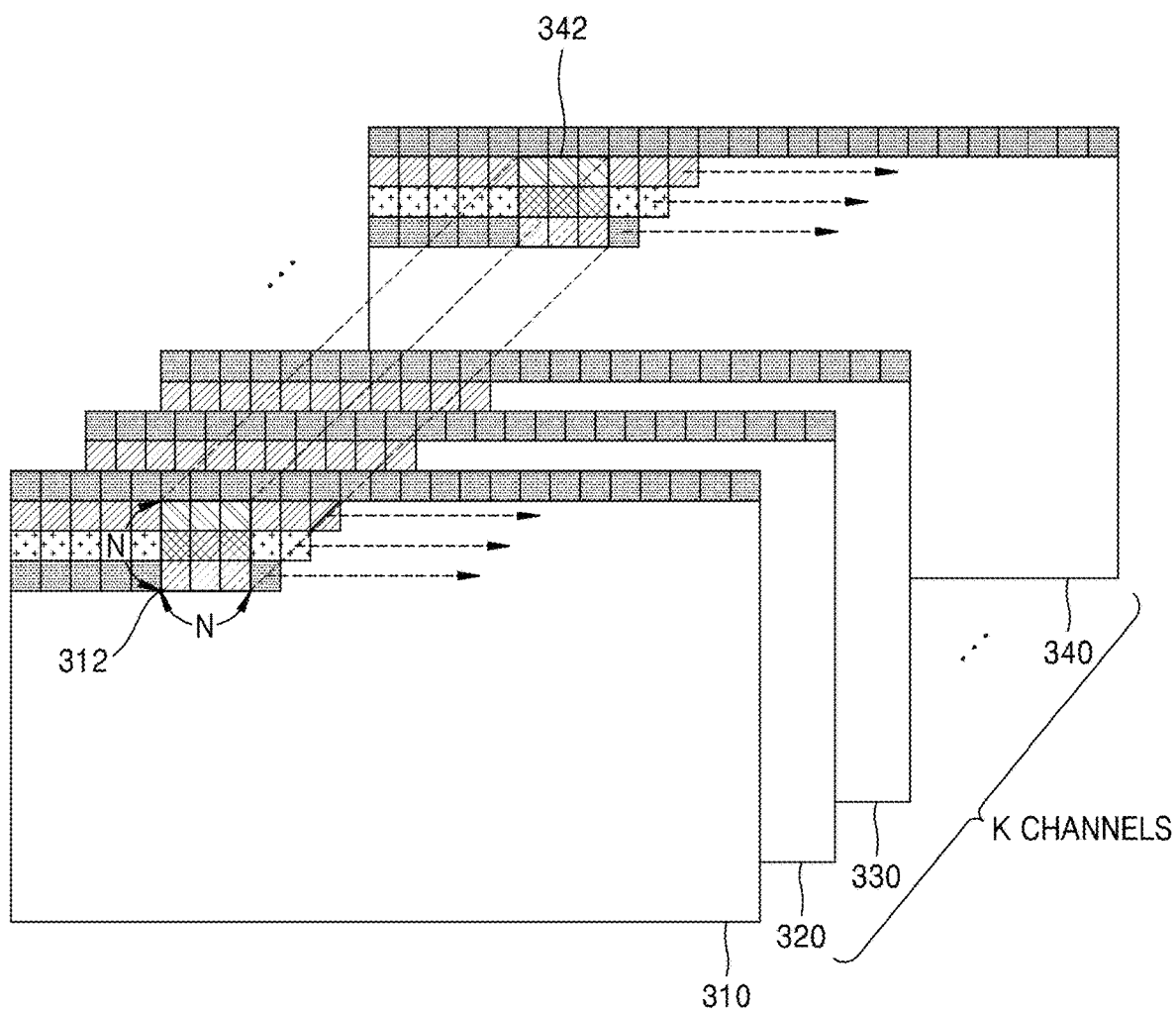
FIG. 3 is a diagram illustrating an example of performing a convolution operation on multi-channel feature maps and a filter kernel, according to an embodiment.

FIG. 3 is a diagram illustrating an example of performing a convolution operation on multi-channel feature maps and a filter kernel, according to an example embodiment.

In an example embodiment, a neural network-based image processing process is a process in which the convolution operation is performed on an input image and a filter kernel at each layer. FIG. 3 visually illustrates convolution operations 312 and 342 performed on multi-channel feature maps 310, 320, 330, and 340 and N×N×K filter kernels to produce one output pixel.

In an example embodiment, at an $I^{th}$ layer of a CNN, the convolution operation is performed on the multi-channel feature maps 310, 320, 330, and 340 produced at an $(I-1)^{th}$ layer and the filter kernels 312 and 342 having L of N×N×K pixel weights. Referring to FIG. 3, when the number of input channels in a layer is K, the size of input data on which the convolution operation is performed using filter kernels is N×N×K. Feature maps of L channels are produced at the $I^{th}$ layer by performing the convolution operation using L of N×N×K filter kernels.

In an example embodiment, an equation of the convolution operation of the CNN may be expressed by Equation 1 below:

$$y[l][x][y] = \sum_{k=0}^{K-1} \sum_{m=-\frac{N}{2}}^{\frac{N}{2}} \sum_{n=-\frac{N}{2}}^{\frac{N}{2}} (w[l][k][m][n] * p[k][x+m][y+n] + b) \quad \text{[Equation 1]}$$

$$(l = 0, \ldots, L-1)$$

In Equation 1, l represents the number of channels of output multi-channel feature maps, x and y represents a location of a pixel in an image, K and N respectively represents a channel direction and a size of a filter kernel in a row/column direction, and b represents a constant. w[l][k][m][n] represents a coefficient of the filter kernel. p[k][x+m][y+n] represents a pixel value of a feature map input to a current layer. y[l][x][y] represents a pixel value of a feature map produced at the current layer through the convolution operation. According to Equation 1, the convolution operation is performed on a pixel-by-pixel basis on each layer of the CNN.

Figure 4:
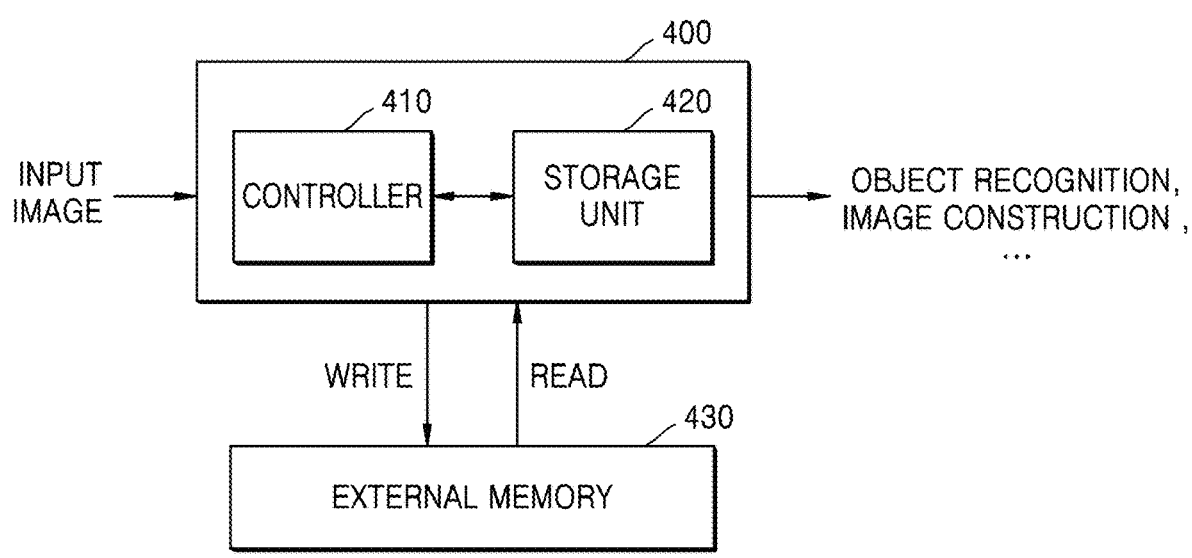
FIGS. 4 and 5 are block diagrams illustrating example image processing apparatuses for analyzing each of feature maps at a first layer and determining feature maps for performing a multi-channel feature map operation at a second layer based on a result of analyzing each of the feature maps during a CNN-based image processing process using a multi-channel feature map, according to various embodiments.
Figure 5:
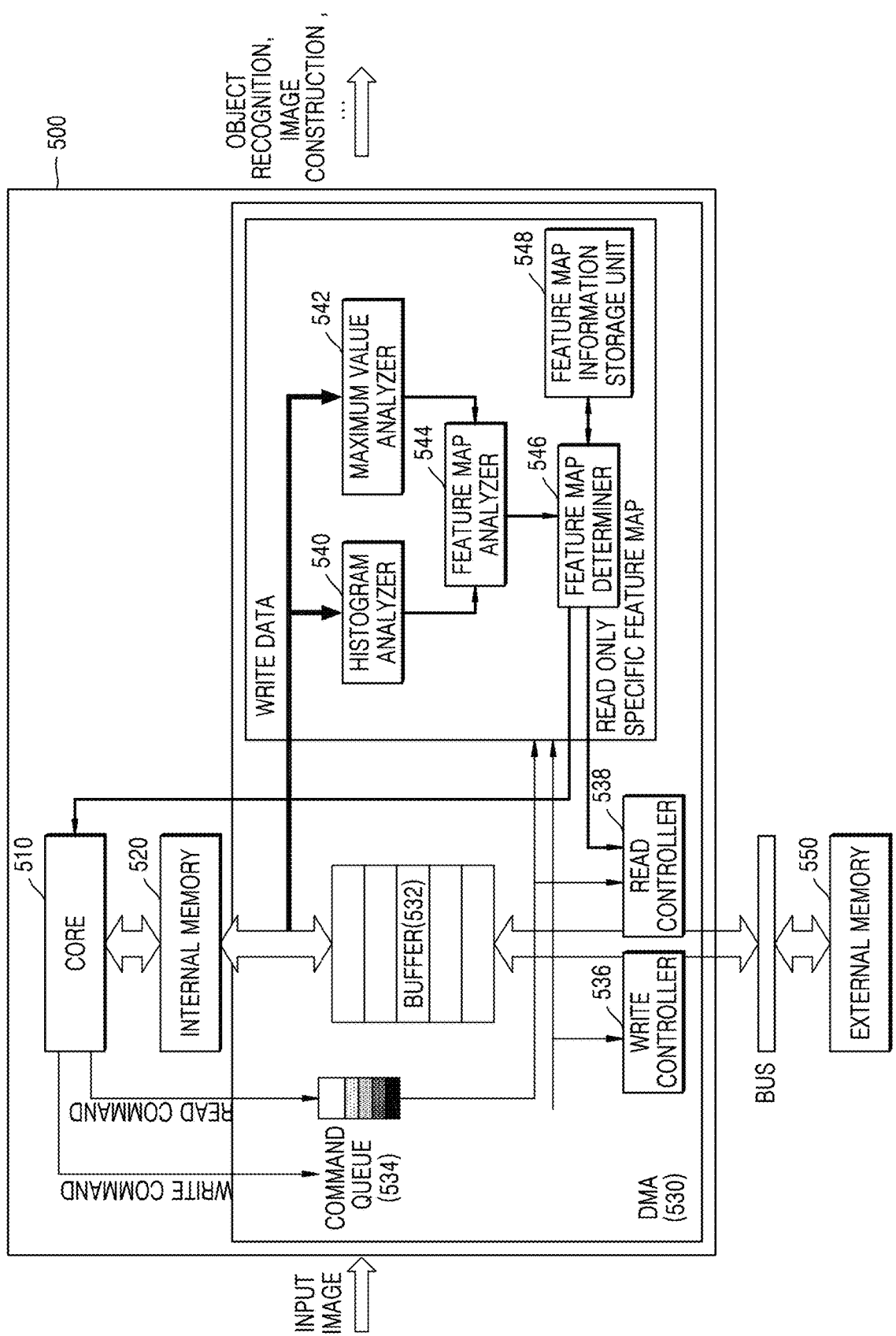

FIGS. 4 and 5 are block diagrams illustrating example image processing apparatuses for analyzing each of feature maps at a first layer and determining feature maps for performing a multi-channel feature map operation at a second layer based on a result of analyzing each of the feature maps during a CNN-based image processing process using a multi-channel feature map, according to embodiments.

Referring to FIG. 4, an image processing apparatus 400 according to an embodiment may include a controller (e.g., including processing circuitry) 410 and a storage unit (e.g., including a memory) 420. However, these components are merely illustrated to describe the present embodiment and components which may be included in the image processing apparatus 400 are not limited thereto. The image processing apparatus 400 of FIG. 4 may correspond to the image processing apparatus 100 of FIG. 1.

For example, referring to FIG. 5, an image processing apparatus 500 according to an embodiment may include a core (e.g., including processing circuitry) 510, an internal memory 520, and a direct memory access (DMA) unit (e.g., including DMA circuitry) 530. However, these components are merely illustrated to describe the present embodiment and components which may be included in the image processing apparatus 500 are not limited thereto. In an example embodiment, the DMA unit 530 may include various DMA circuitry, such as, for example, and without limitation, a buffer 532, a command que 534, a write controller 536, a read controller 538, a histogram analyzer (e.g., including processing circuitry and/or program elements) 540, a maximum value analyzer (e.g., including processing circuitry and/or program elements) 542, a feature map analyzer (e.g., including processing circuitry and/or program elements) 544, a feature map determiner (e.g., including processing circuitry and/or program elements) 546, and a feature map information storage unit (e.g., including a memory) 548, or the like. However, these components are merely illustrated to describe the present embodiment and components which may be included in the DMA unit 530 are not limited thereto.

In an example embodiment, a process performed by the DMA unit 530 may be performed by the internal memory 520 or an external memory 550.

The controller 410 may include various processing circuitry and process an input image and perform object recognition, image reconstruction, etc., and may control data to be read from or written to an external memory 430.

As described above with reference to FIG. 1, the amount of calculation and a necessary memory bandwidth may decrease when each of feature maps having N channels at an $L^{th}$ layer may be analyzed and the number of feature maps for performing a feature map operation at an $(L+1)^{th}$ layer may be decreased to, for example, M channels (here, M<N) using a result of analyzing each of the feature maps. Thus, in an example embodiment, the controller 410 may identify whether values of pixels of each of the feature maps having a plurality of channels at the first layer are zero and control information regarding the result of identifying whether the values of the pixels are zero to be stored in the storage unit 420.

In an example embodiment, the information regarding the result of identifying whether the values of the pixels are zero may include, but is not limited to, information regarding pixels having values which are not zero among the feature maps having the N channels at the $L^{th}$ layer, channel information, location information, and image feature information of the feature maps having pixel values which are all zero, etc. For example, when feature maps written to the external memory 430 is read at the $(L+1)^{th}$ layer, the information regarding the result of identifying whether the values of the pixels are zero may include information necessary to exclude a feature map having pixel values which are all zero among the feature maps at the $L^{th}$ layer.

In an example embodiment, the controller 410 may write the image feature information of the feature maps at the $L^{th}$ layer to the external memory 430, read from the external memory 430 image feature information of feature maps among image feature information, excluding the feature maps of which pixel values are all zero, written to the basis of the information regarding the result of identifying whether the values of the pixels are zero, and perform the feature map operation at the $(L+1)^{th}$ layer using the read image feature information of the feature maps.

In an example embodiment, the image feature information of the feature maps at the $L^{th}$ layer may include at least one among channel information, layer information, and values of pixels of the feature maps at the $L^{th}$ layer.

In an example embodiment, the feature map operation performed at the $(L+1)^{th}$ layer may include the convolution operation, the activation function operation, the pooling operation, resampling, or the like but are not limited thereto.

The storage unit 420 may store various types of data or applications for driving and controlling the image processing apparatus 400 under control of the controller 410. In an example embodiment, the term "storage unit" may be understood to include the storage unit 420 and a read-only memory (ROM) or a random access memory (RAM) of the controller 410 but is not limited thereto, and may include an external memory (not shown) (e.g., a server, a micro secure digital (SD) card, a universal serial bus (USB) memory, etc.). The storage unit 420 may include a nonvolatile memory, a volatile memory, a hard disc drive (HDD), or a solid state drive (SSD).

In an example embodiment, the storage unit 420 may store information regarding the result of identifying whether all values of pixels of each of the feature maps having the plurality of channels at the first layer are zero, under control of the controller 410.

Although FIG. 5 illustrates that the DMA unit 530 includes the feature map analyzer 544, the feature map determiner 546, the feature map information storage unit 548, etc. and thus may handle a process of analyzing each of the feature maps having the N channels at the $L^{th}$ layer and decreasing the number of feature maps for performing the feature map operation at the $(L+1)^{th}$ layer using a result of analyzing each of the feature maps but embodiments are not limited thereto. The histogram analyzer 540 and the maximum value analyzer 542 will be described with reference to FIG. 7 below.

Figure 6:
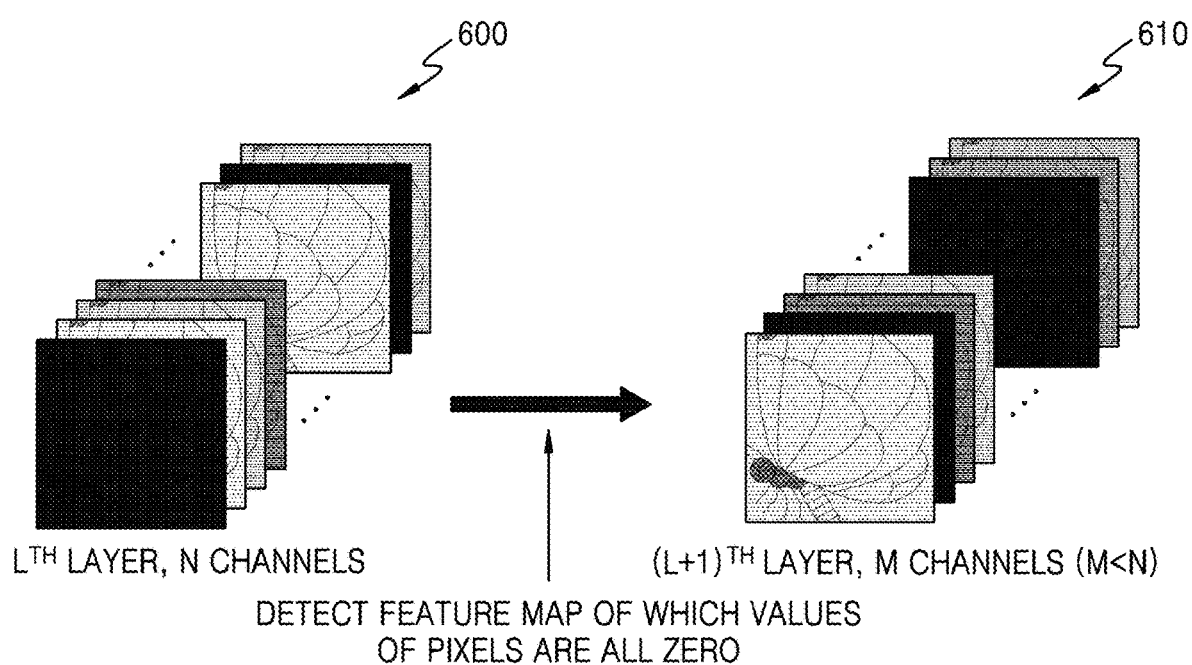
FIG. 6 is a diagram illustrating an example of feature maps for performing a multi-channel feature map operation at a second layer, the feature maps being determined using a result of analyzing feature maps at a first layer, according to an embodiment.

FIG. 6 is a diagram illustrating an example of feature maps for performing a multi-channel feature map operation at a second layer, the feature maps being determined using a result of analyzing feature maps at a first layer, according to an embodiment.

Referring to FIG. 6, an image processing apparatus may identify whether values of pixels of each of feature maps 600 having N channels at an $L^{th}$ layer are zero, and identify (N−M) feature maps of which values of pixels are all zero (here, M is an integer, M<N). The image processing apparatus may store information regarding the (N−M) feature maps and write N feature maps to an external memory. Furthermore, the image processing apparatus may perform a feature map operation at an $(L+1)^{th}$ layer by reading from the external memory only M feature maps 610 among the N feature maps, excluding the (N−M) feature maps. Accordingly, each of the feature maps having the N channels at the $L^{th}$ layer is analyzed and the number of feature maps for performing the feature map operation at the $(L+1)^{th}$ layer is decreased to, for example, M channels (M<N) using a result of analyzing each of the feature maps, thereby decreasing the amount of calculation of the feature map operation and a necessary memory bandwidth.

Figure 7:
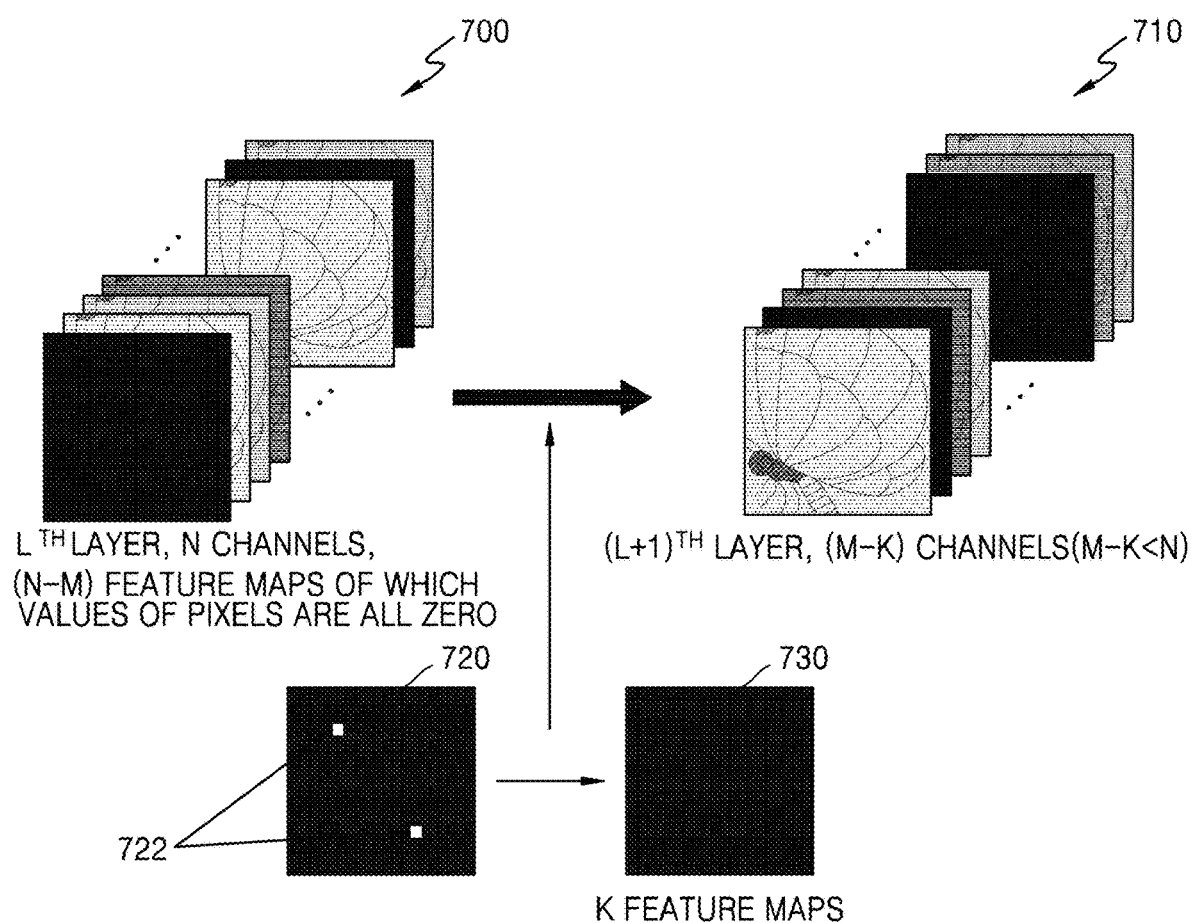
FIG. 7 is a diagram illustrating an example of feature maps for performing a multi-channel feature map operation at a second layer, the feature maps being determined using a result of analyzing feature maps at a first layer, according to another embodiment.

FIG. 7 is a diagram illustrating an example of feature maps for performing a multi-channel feature map operation at a second layer, the feature maps being determined using a result of analyzing feature maps at a first layer, according to another embodiment.

As described above with reference to FIG. 6, an image processing apparatus may read only remaining feature maps among N feature maps at an $L^{th}$ layer, excluding feature maps of which values of pixels are all zero, from an external memory, and use the remaining feature maps for a feature map operation to be performed at an $(L+1)^{th}$ layer, thereby decreasing the amount of calculation of the feature map operation and a necessary memory bandwidth. However, the feature map operation performed at an $(L+1)^{th}$ layer is less influenced by a feature map in which most of pixel values are zero and the remaining pixel values are close to zero and thus this feature map is preferably excluded during the performing of the feature map operation at the $(L+1)^{th}$ layer. However, since all the pixel values of this feature map are not zero, this feature memory may be read from the external memory according to the embodiments of FIGS. 4 to 6.

Accordingly, an image processing apparatus according to an embodiment may more significantly decrease the amount of calculation and memory bandwidth by setting values of pixels satisfying a certain condition of each of feature maps to zero, identifying whether values of pixels of each of the feature maps are zero, and excluding a feature map of which all of pixel values are zero during the performing of the feature map operation at the $(L+1)^{th}$ layer.

In an example embodiment, the image processing apparatus may set values of pixels satisfying a certain condition of each of feature maps having a plurality of channels at the $L^{th}$ layer to zero, identify whether values of pixels of each of the feature maps are zero, stores information regarding a result of identifying whether the values of the pixels are zero, write image feature information of the feature maps at the $L^{th}$ layer to an external memory, read from the external memory the image feature information of the remaining feature maps among the image feature information written to the external memory, excluding a feature map of which the values of the pixels are all zero, based on the information regarding the result of identifying whether the values of the pixels are zero, and perform the feature map operation at the $(L+1)^{th}$ layer using the read image feature information of the feature maps.

The certain condition means a condition for comparing image features between feature maps included in each layer. The image features of each of the feature maps may be understood to include, for example, and without limitation, an analysis of a maximum value of the pixels of the feature map, an image histogram, the sum, average, and variance of the values of the pixels, or the like.

In an example embodiment, the image processing apparatus may identify whether a maximum value of the pixels of each of the feature maps at the $L^{th}$ layer is equal to or less than a certain threshold value (e.g., 5% of white 255), and set all of the pixels when this condition is satisfied to zero. Referring to FIG. 5, this operation may be performed by the histogram analyzer 540 but embodiments are not limited thereto.

In an example embodiment, the image processing apparatus may identify whether the number of specific pixel values (e.g., 5% of white 255) of the image histogram of each of the feature maps at the $L^{th}$ layer is equal to or less than a certain threshold value (e.g., 0.01% to 0.1% of the number of pixels of each of the feature maps), and set all of these pixels to zero when this condition is satisfied to zero. Referring to FIG. 5, this operation may be performed by the maximum value analyzer 542 but embodiments are not limited thereto.

Referring to FIG. 7, the image processing apparatus may identify image features of each of feature maps 720 of feature maps 700 having N channels at the $L^{th}$ layer including a feature map of values of which (N−M) pixels are all zero, and set values of pixels 722 satisfying a certain condition (e.g., a maximum-value analysis, a histogram analysis, etc.) to zero. In this case, values of pixels of each of K feature maps 730 are all zero and thus the image processing apparatus may identify ((N−M)+K) feature maps of which values of pixels are all zero (here, K is an integer, K<M). The image processing apparatus may store information regarding the ((N−M)+K) feature maps and write N feature maps to an external memory. Furthermore, the image processing apparatus may read only (M−K) feature maps 710 from the external memory among the N feature maps, excluding the ((N−M)+K) feature maps, and perform the feature map operation at the $(L+1)^{th}$ layer.

Accordingly, the number of feature maps for performing the feature map operation at the $(L+1)^{th}$ layer is decreased by K when compared to the embodiment of FIG. 6, and thus the amount of calculation of the feature map operation and a necessary memory bandwidth may be thus significantly deceased.

Figure 8:
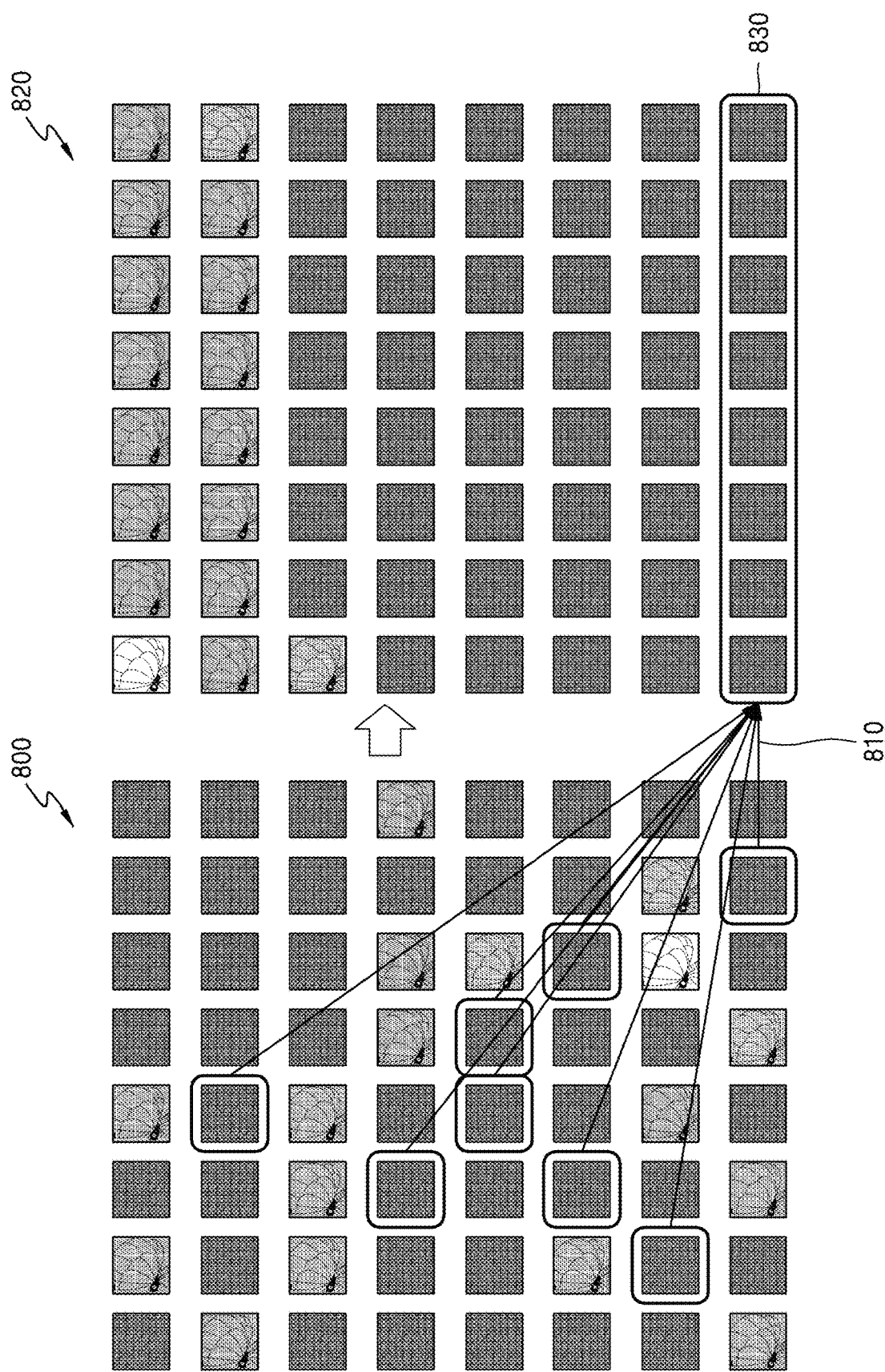
FIG. 8 is a diagram illustrating a process of re-ordering multi-channel feature maps according to an embodiment.

FIG. 8 is a diagram illustrating a process of re-ordering multi-channel feature maps according to an embodiment.

To more efficiently perform encoding, an image processing apparatus according to an embodiment may re-order multi-channel feature map images produced during a neural network-based image processing process. FIG. 8 illustrates original feature maps 800 and re-ordered feature maps 820 obtained by re-ordering the original feature maps 800. Although, for convenience of explanation, FIG. 8 illustrates that each of the original feature maps 800 and the re-ordered feature maps 820 has, for example, and without limitation, 64 channels, the number of channels should not be understood as being limited to 64.

Referring to FIG. 8, a change in a dynamic range of pixel values of each image in the original feature maps 800 is not uniform. Here, the term "dynamic range" may refer, for example, to a value obtained by subtracting a minimum output value of a feature map of each channel from a maximum output value thereof. The image processing apparatus according to an embodiment may perform inter-prediction when estimation is performed. When a change in the dynamic range of pixel values of each image is large as in the original feature maps 800, compression performance may be low. In order to overcome a decrease in compression performance when inter-prediction between channels is performed, the image processing apparatus according to an embodiment may increase a degree of correlation between feature maps adjacent in a channel direction to improve compression performance.

A method of re-ordering a dynamic range of the original feature maps 800 to the re-ordered feature maps 820 will be described in detail below.

The image processing apparatus according to an embodiment may analyze features of a filter kernel of each layer, and re-order multi-channel feature maps according to the dynamic range of each of the feature maps. In detail, the image processing apparatus may identify a maximum output value of a feature map for each channel by inputting a specific value to a filter kernel of each channel. For example, the image processing apparatus may input a maximum value (e.g., 255) to the filter kernel when a weight of the filter kernel is a positive value, and may input '0' to the filter kernel when the weight of the filter kernel is a negative value. Furthermore, the image processing apparatus may identify a minimum output value of the feature map for each channel by inputting a specific value to the filter kernel of each channel. For example, the image processing apparatus may input a maximum value (e.g., 255) to the filter kernel when the weight of the filter kernel is a negative value, and input '0' to the filter kernel when the weight of the filter kernel is positive value. When the dynamic range of the feature map for each channel is identified from the maximum output value and the minimum output value of the feature map for each channel, the image processing apparatus according to an embodiment may re-order the multi-channel feature maps based on the identified dynamic range. For example, the image processing apparatus may re-order the multi-channel feature maps in an ascending order or a descending order according to the dynamic range.

FIG. 8 illustrates the re-ordered feature maps 820 obtained by re-ordering the original feature maps 800 in the descending order according to the dynamic range. A degree of correlation between feature maps adjacent in a channel direction in the re-ordered feature maps 820 is higher than that in the original feature maps 800. Accordingly, compression performance may be improved when the image processing apparatus performs inter-prediction between channels using the re-ordered feature maps 820.

Referring to FIG. 8, when the feature maps 800 are re-ordered in the descending order according to the dynamic range, feature maps 810 which are distributed regardless of a channel position before the feature maps 800 are re-ordered and of which values of pixels are all zero may be re-ordered to feature maps 830 located adjacent to each other. In an example embodiment, the image processing apparatus may identify whether values of pixels of each of the re-ordered feature maps 820 are zero. Furthermore, the image processing apparatus may set values of pixels satisfying a certain condition of each of the re-ordered feature maps 820 to zero and identify whether values of pixels of each of the re-ordered feature maps 820 are zero as described with reference to FIG. 7.

In an example embodiment, compression performance may be improved when the image processing apparatus performs inter-prediction between channels using the re-ordered feature maps 820 and information regarding a result of identifying the values of the pixels of each of the re-ordered feature maps 820 are zero.

When encoding is completed based on the re-ordered feature maps 820, the image processing apparatus according to an embodiment decodes the re-ordered feature maps 820. In an example embodiment, the image processing apparatus may use re-ordering information obtained from a bitstream to reconstruct the decoded re-ordered feature maps 820 in the original channel order. In an example embodiment, the re-ordering information may include at least one among index information indicating the original position of the original feature maps 800 and information regarding movement of the feature maps. Alternatively, in an example embodiment, the index information may include information regarding an order in which each of channels of the original feature maps 800 are arranged. In an example embodiment, the re-ordering information may be encoded by the image processing apparatus, and stored in a header of a bitstream.

Figure 9:
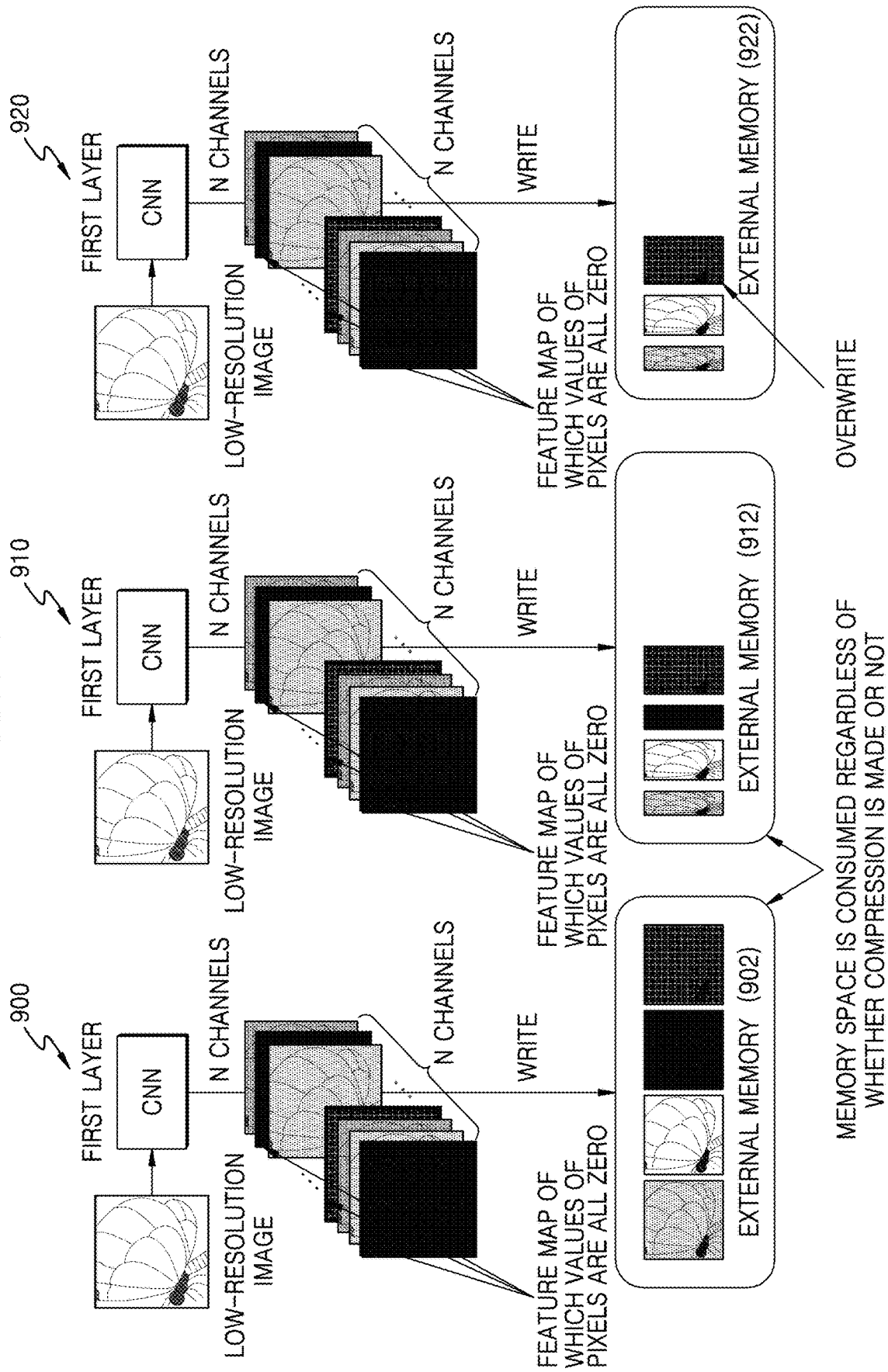
FIG. 9 is a diagram illustrating an example of decreasing a memory usage rate by performing an image processing method according to an embodiment.

FIG. 9 is a diagram illustrating an example of decreasing a memory usage rate by performing an image processing method according to an embodiment.

FIG. 9 illustrates writing feature maps having N channels to an external memory 902 without encoding the feature maps according to a feature map operation at a first layer (embodiment 900), encoding feature maps having N channels according to the feature map operation at the first layer and writing the encoded feature maps to an external memory 912 (embodiment 910), and encoding feature maps having N channels according to the feature map operation at the first layer and overwriting the encoded feature maps to an external memory 922 (embodiment 920), the embodiments 900, 910, and 920 being performed by an image processing apparatus. Referring to FIG. 9, an external memory bandwidth needed in the embodiment 910 in which the image processing apparatus encodes the feature maps and writes the encoded feature maps to the external memory 912 is less than that in the embodiment 900 in which the image processing apparatus writes the feature maps to the external memory 902 without encoding the feature maps. However, even if the feature maps are encoded, decreasing memory bandwidth may be limited due to a header related to basic encoding units.

In an example embodiment, the image processing apparatus may identify feature maps of which values of pixels are all zero. Image feature information of these feature maps is not read from an external memory when a feature map operation is performed at a subsequent layer. Thus, the image processing apparatus may remove such unnecessary information when image feature information of feature maps is written to the external memory. In detail, in an example embodiment, the image processing apparatus may overwrite, to the external memory 922, image feature information of a feature map to be written after the image feature information of the feature maps of which the values of the pixels are all zero and which are written to the external memory. Accordingly, referring to FIG. 9, an external memory bandwidth needed in the embodiment 920 in which the feature maps having N channels are encoded and over-written to the external memory 922 according to the feature map operation at the first layer, performed by the image processing apparatus, is less than those in the other two embodiments 900 and 910.

Figure 10:
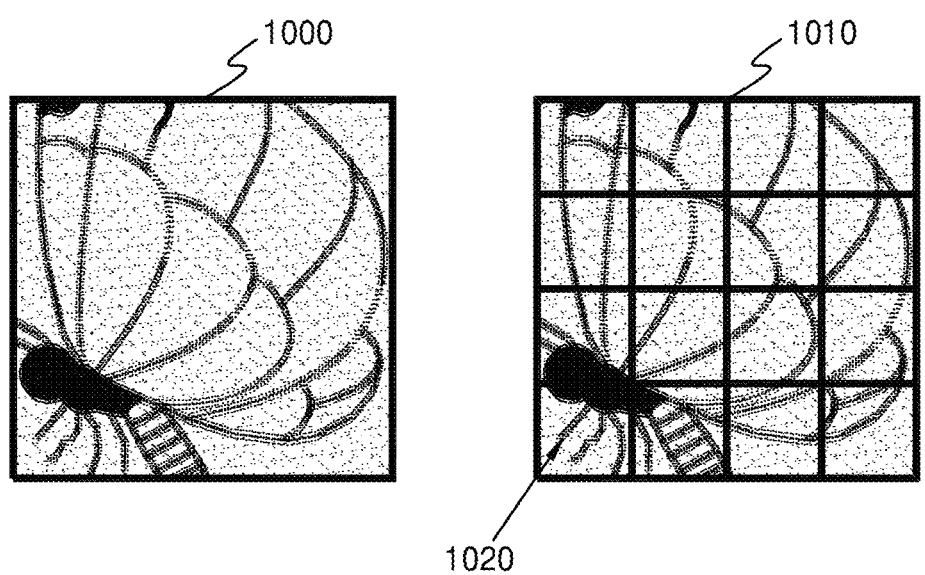
FIG. 10 is a diagram illustrating an example of applying an image processing method to a feature map divided into a plurality of regions, according to an embodiment.

FIG. 10 is a diagram illustrating an example of applying an image processing method to a feature map divided into a plurality of regions, according to an embodiment.

In an example embodiment, an image processing apparatus may perform a process of analyzing each of feature maps having N channels at an $L^{th}$ layer and decreasing the number of feature maps for performing a feature map operation at an $(L+1)^{th}$ layer using a result of analyzing each of the feature maps with respect to each of a plurality of regions divided from one feature map.

Referring to FIG. 10, the image processing apparatus may divide a certain feature map 1000 selected from among feature maps having N channels at the $L^{th}$ layer into a plurality of regions 1020. The image processing apparatus may identify whether values of pixels of each of the plurality of regions 1020 divided from the feature map 1010 are zero and store information regarding a result of identifying whether the values of the pixels of each of the plurality of regions 1020 are zero. The image processing apparatus may set a value of a pixel satisfying a certain condition of each of the plurality of regions 1020 divided from the feature map 1010 to zero, and store information regarding a result of identifying whether the values of the pixels of each of the plurality of regions 1020 are zero. Furthermore, the image processing apparatus may write image feature information of the feature maps at the $L^{th}$ layer to an external memory, reads from the external memory the image feature information of the feature maps from among the image feature information written to the external memory, excluding the feature map of which the values of the pixels are zero, based on the information regarding the result of identifying whether the values of the pixels are zero, and perform a feature map operation at an $(L+1)^{th}$ layer using the read image feature information of the feature maps.

Figure 11:
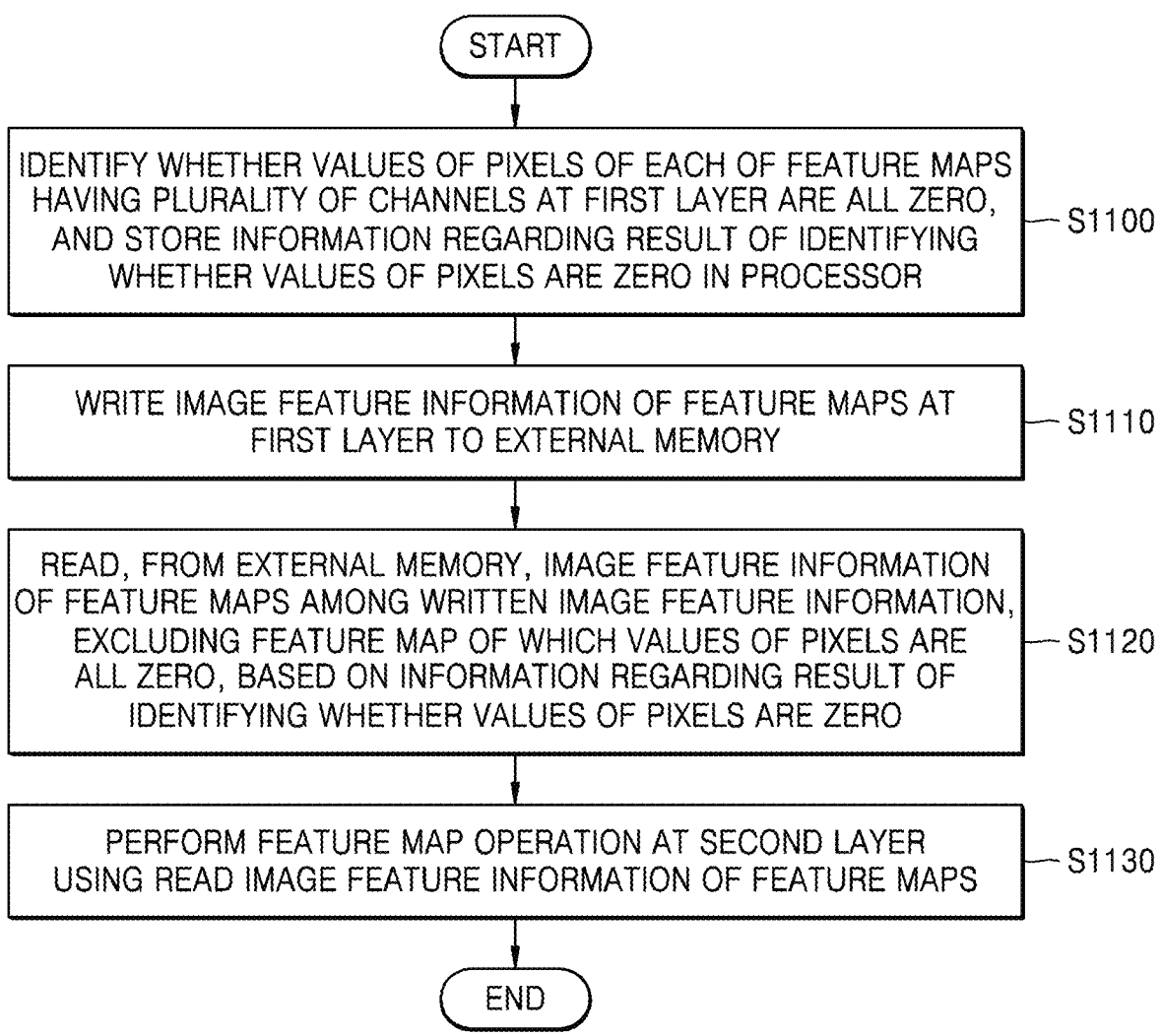
FIG. 11 is a flowchart illustrating an image processing method of analyzing each of feature maps at a first layer and determining feature maps for performing a multi-channel feature map operation at a second layer based on a result of analyzing each of the feature maps during a CNN-based image processing process using a multi-channel feature map, according to an embodiment.

FIG. 11 is a flowchart illustrating an image processing method of analyzing each of feature maps at a first layer and determining feature maps for performing a multi-channel feature map operation at a second layer based on a result of analyzing each of the feature maps during a CNN-based image processing process using a multi-channel feature map, according to an embodiment.

In operation S1100, an image processing apparatus may identify whether values of pixels of each of feature maps having a plurality of channels at the first layer are zero, and store information regarding a result of identifying whether the values of the pixels are zero in a processor.

In an example embodiment, the information regarding the result of identifying whether the values of the pixels are zero may include, but is not limited to, channel information, location information, or image feature information of feature maps of which values of pixels are all zero among feature maps having N channels at an $L^{th}$ layer. For example, when feature maps written to the external memory 430 is read at an $(L+1)^{th}$ layer, the information regarding the result of identifying whether the values of the pixels are zero may include information needed to exclude the feature maps of which the values of the pixels are all zero among the feature maps at the $L^{th}$ layer.

In operation S1110, the image processing apparatus may write image feature information of the feature maps at the first layer to the external memory.

In an example embodiment, the image feature information of the feature maps at the $L^{th}$ layer may include at least one among channel information, layer information, and the values of the pixels of the feature maps at the $L^{th}$ layer.

In operation S1120, the image processing apparatus may read from the external memory 430 information regarding pixels having values which are not zero among the written image feature information, based on the information regarding the result of identifying whether values of pixels are zero.

In operation S1130, the image processing apparatus may perform the feature map operation at the second layer using the read information.

In an example embodiment, the feature map operation at the $(L+1)^{th}$ layer may include the convolution operation, the activation function operation, the pooling operation, or resampling but is not limited thereto.

In an example embodiment, when a capacity of an internal memory of the image processing apparatus is sufficiently large, image feature information of the feature maps among the feature maps having the N channels at the $L^{th}$ layer, excluding the feature maps of which the values of the pixels are all zero, may be written to the external memory rather than writing the image feature information of all the feature maps having the N channels at the $L^{th}$ layer to the external memory 430.

The above-described embodiments can be embodied as a program executable in a computer, and executed in a general-purpose digital computer capable of executing the program via a computer-readable recording medium. Data structures used in these embodiments may be written to a computer-readable recording medium via various means. Alternatively, these embodiments can be embodied in the form of a recording medium storing instructions executable by a computer, such as a program module executed by a computer. For example, methods realized using a software module or an algorithm may be written to a computer-readable recording medium in the form of codes readable and executable by a computer or program commands.

The computer-readable recording medium may be any recording medium accessible by a computer, and may include a volatile or nonvolatile medium or a separable or non-separable medium. Examples of the computer-readable recording medium may include magnetic recording media, e.g., a ROM, a floppy disk, a hard disc, etc., optical recording media, e.g., a CD-ROM or a DVD but are not limited thereto. Examples of computer-readable recording medium may further include a computer storage medium and a communication medium.

A plurality of computer-readable recording media may be distributed among computer systems interconnected through a network, and data stored in the distributed recording media, e.g., program instructions and code, may be executed by at least one computer.

Specific embodiments described herein are merely illustrative example embodiments and should not be understood as limiting the scope of the disclosure. For brevity's sake, conventional electronic configurations, control systems, software, and other functional aspects of these systems may be omitted herein.

The above disclosure is intended to merely provide examples, and it would be apparent to those of ordinary skill in the art that various modifications may be easily made in the disclosure without departing from the scope or essential features of the disclosure. Accordingly, the embodiments set forth herein should be considered in descriptive sense only and not for purposes of limitation. For example, components described herein as being included in one device may be dispersed, and components described herein as being dispersed may be combined with one another.

It would be apparent to those of ordinary skill in the art that the disclosure may be embodied in many different forms without departing from the essential features thereof.

The disclosure may be embodied in many different forms and accomplished in various embodiments. Thus, it should be understood that the disclosure is not limited to the various example embodiments set forth herein and is to cover all modifications, equivalents, and alternatives falling within the scope of the disclosure. Accordingly, these embodiments should be understood in a descriptive manner other than a restrictive manner.

The scope of the disclosure is defined not by the detailed description of the disclosure but by the appended claims, and all differences within the scope will be understood as being included in the disclosure.

What is claimed is:

1. A convolution neural network (CNN)-based image processing apparatus comprising:
a storage unit comprising a memory; and
a controller configured to identify whether values of pixels of each of feature maps having a plurality of channels at a first layer are zero, to control storing of information regarding a result of identifying whether the values of the pixels are zero in the storage unit, to write image feature information of the feature maps at the first layer to an external memory, to read information regarding pixels having values that are not zero among the written image feature information from the external memory based on the information regarding the result of identifying whether the values of the pixels are zero, and to perform a feature map operation at a second layer using the read information.

2. The image processing apparatus of claim 1, wherein the information regarding the result of identifying whether the values of the pixels are zero comprises channel information of a feature map of which values of pixels are all zero among the feature maps at the first layer.

3. The image processing apparatus of claim 2, wherein the controller is configured to read, from the external memory, image feature information of feature maps among the written image feature information excluding the feature map of which the values of the pixels are all zero based on the information regarding the result of identifying whether the values of the pixels are zero, and to perform a feature map operation at a second layer using the read image feature information of the feature maps.

4. The image processing apparatus of claim 1, wherein the image feature information of the feature maps comprises at least one of: channel information, layer information, and values of pixels of each of the feature maps.

5. The image processing apparatus of claim 1, wherein the feature map operation comprises at least one of: a convolution operation, an activation function operation, a pooling operation, and a resampling operation of feature maps at each layer.

6. The image processing apparatus of claim 3, wherein the controller is configured to set a value of a pixel satisfying a certain condition of each of the feature maps having the plurality of channels at the first layer to zero, and to identify whether values of pixels of each of the feature maps are zero.

7. The image processing apparatus of claim 6, wherein the certain condition includes a condition wherein a maximum value among the values of the pixels of each of the feature maps at the first layer is equal to or less than a certain threshold value.

8. The image processing apparatus of claim 6, wherein the certain condition includes a condition wherein, in a pixel histogram of each of the feature maps at the first layer, a number of pixel values greater than or equal to a specific pixel value is equal to or less than a certain threshold value.

9. The image processing apparatus of claim 1, wherein the controller is configured to analyze a dynamic range of the values of the pixels of each of the feature maps at the first layer, to re-order the feature maps at the first layer based on the dynamic range, and to identify whether values of pixels of the re-ordered feature maps are zero.

10. An image processing method based on a convolutional neural network (CNN) and performed by a processor, the method comprising:
identifying whether values of pixels of each of feature maps having a plurality of channels at a first layer are zero;
storing information regarding a result of identifying whether the values of the pixels are zero;
writing image feature information of the feature maps at the first layer to an external memory;
reading information regarding pixels having values which are not zero among the written image feature information from the external memory based on the information regarding the result of identifying whether the values of the pixels are zero; and
performing a feature map operation at a second layer using the read information.

11. The method of claim 10, wherein the information regarding the result of identifying whether the values of the pixels are zero comprises channel information of a feature map of which values of pixels are all zero among the feature maps at the first layer.

12. The method of claim 11, wherein the reading of the information regarding the pixels having the values which are not zero from the external memory comprises reading, from the external memory, image feature information of feature maps among the written image feature information excluding a feature map of which values of pixels are all zero based on the information regarding the result of identifying whether the values of the pixels are zero.

13. The method of claim 10, wherein the image feature information of the feature maps comprises at least one of: channel information, layer information, and values of pixels of each of the feature maps.

14. The method of claim 10, wherein the feature map operation comprises at least one of: a convolution operation, an activation function operation, a pooling operation, and a resampling operation of feature maps at each layer.

15. The method of claim 12, wherein the identifying of whether the values of the pixels of each of the feature maps are zero and the storing of the information regarding the result of identifying whether the values of the pixels are zero comprise: setting a value of a pixel satisfying a certain condition of each of the feature maps having the plurality of channels at the first layer to zero, identifying whether values of pixels of each of the feature maps are zero, and storing information regarding a result of identifying whether the values of the pixels are zero.

16. The image processing method of claim 15, wherein the certain condition includes a condition wherein a maximum value among the values of the pixels of each of the feature maps at the first layer is equal to or less than a certain threshold value.

17. The image processing method of claim 15, wherein the certain condition includes a condition wherein, in a pixel histogram of each of the feature maps at the first layer, a number of pixel values greater than or equal to a specific pixel value is equal to or less than a certain threshold value.

18. The image processing method of claim 10, wherein the identifying of whether the values of the pixels of each of the feature maps are zero and the storing of the information regarding the result of identifying whether the values of the pixels are zero comprise:
analyzing a dynamic range of the values of the pixels of each of the feature maps at the first layer;

re-ordering of the feature maps at the first layer based on the dynamic range; and identifying whether values of pixels of each of the re-ordered feature maps are zero; and storing information regarding a result of identifying whether the values of the pixels of each of the re-ordered feature maps are zero.

19. An image processing apparatus based on a convolutional neural network (CNN), the image processing apparatus comprising:

a storage unit comprising a memory; and a controller configured to identify whether values of pixels of each of feature maps having a plurality of channels at a first layer are zero, to control storing of information regarding a result of identifying whether the values of the pixels are zero in the storage unit, to write image feature information of feature maps among the written image feature information, excluding a feature map of which values of pixels are all zero, to an external memory, based on the information regarding the result of identifying whether the values of the pixels are zero, to read the written image feature information of the feature maps from the external memory, and to perform a feature map operation at a second layer using the read image feature information of the feature maps.

20. A non-transitory computer-readable recording medium having recorded thereon a program for performing the operations of claim 10 in a computer.

* * * * *